Aug. 2, 1949.  E. S. STAPLES  2,477,774
LOAD RANGE MULTIPLIER FOR USE WITH DYNAMOMETERS
Filed Nov. 29, 1946
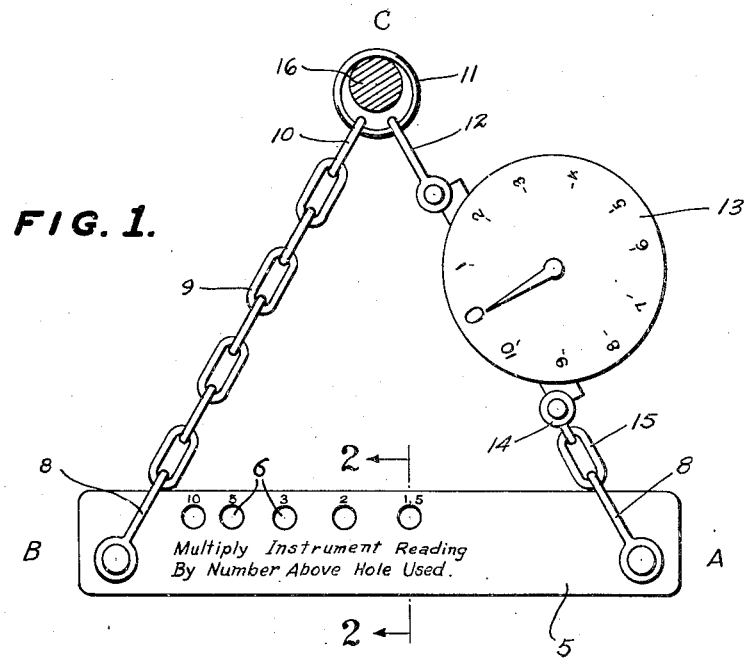
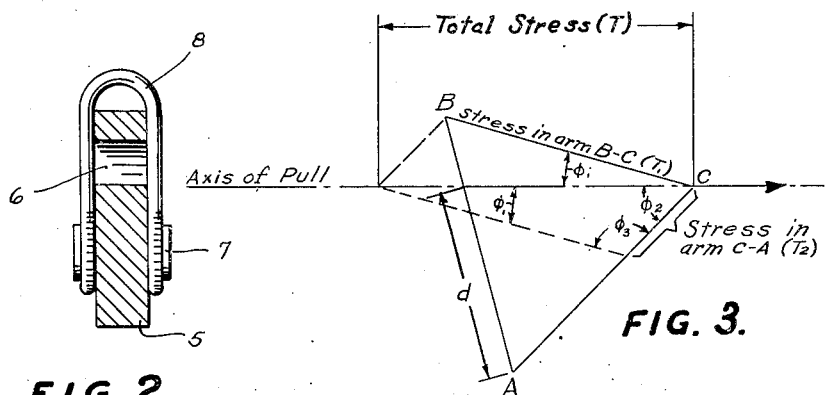
INVENTOR
Edwin S. Staples.
BY
ATTORNEYS Patented Aug. 2, 1949

2,477,774

UNITED STATES PATENT OFFICE 2,477,774

LOAD RANGE MULTIPLIER FOR USE WITH DYNAMOMETERS

Edwin S. Staples, New York, N. Y.

Application November 29, 1946, Serial No. 713,000

3 Claims. (Cl. 73—141)

My invention relates to a load range multiplier for use with dynamometers, although not necessarily restricted to such uses.

An important object of my invention is to provide a simple mechanical device for use with suitable dynamometer load-measuring instruments, which overcomes the inherent limitation found in such instruments, namely, the fact that they have only a single range of scale readings, and therefore loads greater than the full scale capacity cannot be measured.

A further object of the invention is to provide a mechanical load range multiplier which shunts a selected percentage of the actual load being measured around the measuring instrument, thus leaving for the instrument the burden of measuring only a fractional part of the actual load.

A further object of the invention is to provide a mechanical load range multiplier designed to be easily adjusted for various ratios of actual load to indicated or scale load up to a maximum ratio of ten to one.

A still further object of the invention is to provide a device of the character mentioned which is simple, sturdy and durable, and relatively inexpensive to manufacture.

Other objects and advantages of the invention will be apparent during the course of the following description.

In the accompanying drawings, forming a part of this application, and in which like numerals are employed to designate like parts throughout the same:

Figure 1 is a front elevation or plan view of the load range multiplier embodying my invention, showing the same coupled to a dynamometer.

Figure 2 is a vertical section taken on line 2—2 of Figure 1.

Figure 3 is a mathematical diagram, illustrating the principle involved in the device.

In the drawings, where for the purpose of illustration is shown a preferred embodiment of my invention, the numeral 5 designates a rigid load-dividing or proportioning bar, preferably formed of steel, which is provided with a plurality of longitudinally spaced load-connecting or load-suspension openings 6. The openings 6 are all spaced inwardly from the ends of the bar 5, but the openings are near the end of the bar 5 designated B. Each end of the bar 5 has an opening for receiving a pin 7, or the like, and these pins pivotally secure coupling shackles 8 to the bar 5. The shackle 8 adjacent the end B of the bar 5 is connected with a length of linked chain 9, the opposite end of which carries a coupling link 10, which is secured to a suspension or pull ring 11. This suspension or pull ring 11 has connected to it a coupling shackle 12, which is connected with a suitable dynamometer load-measuring instrument or scale 13. This instrument or scale 13 is also connected with a coupling shackle 14 connected to a chain link 15 connected to the shackle 8 which is secured to the end A of the load-dividing bar 5. The device as shown in Figure 1 of the drawings is connected to or suspended from a pull, lift, or suspension coupling 16 by means of the pull or suspension ring 11.

As shown in Figure 1, the arrangement of parts is such that a triangular construction is formed, and the apexes of this triangle are designated by the letters A, B, C.

The theory and operation of the load range multiplier is as follows:

The physical construction of the device is such that when it is in use it forms a mechanical equilateral triangle. The load being measured, regardless of the direction of pull, is connected to the load-dividing bar 5 through one of the openings 6 provided along this bar, the exact point or opening depending upon what percentage of the actual load is to be indicated by the dynamometer or scale 13. The greater the percentage of the actual load to be shunted around the load-measuring instrument 13 through the B—C arm of the device, the nearer to the end B of the load-dividing bar 5 will the load be connected or suspended. For example, if a load to be measured exceeds three times the scale capacity of the load-measuring instrument 13 being used, but does not exceed five times its capacity, the load would be connected to or suspended from the hole 6 which is labeled above such hole with the numeral "5." The indication on the load-measuring instrument 13 should then be multiplied by "5" to obtain the total actual load being measured, four-fifths of which actual load is transmitted through the B—C arm of the triangular load range multiplier. The instruction to multiply the scale reading by the numeral appearing above the hole 6 being used to obtain the actual load being measured, appears upon the surface of the bar 5.

The physical size of the device must be large enough to accommodate a standard dynamometer load-measuring instrument or scale in the C—A arm of the device, but need not be any larger unless the maximum load to be measured induces stresses into the physical parts which require heavier and larger parts, thereby resulting in greater overall dimensions.

A very important point is that the device must always form an equilateral triangle, A—B—C formed as nearly perfectly as possible. Any deviation from a true equilateral triangular construction will introduce error into the dynamometer or scale reading; but this error will be negligible if sufficiently strong materials are employed for the parts of the device, and the device is accurately manufactured. The locating of the openings 6 in the bar 5 to which is connected the load to be measured obviously must be determined with accuracy in order that the true actual load, along the axis of pull, will be correctly and accurately measured when the scale reading of 13 is multiplied by the numeral appearing immediately above the opening 6 through which the load is connected to the load-dividing bar 5. Under load, the arm C—A of the device will be slightly elongated due to the functioning of the dynamometer instrument or scale 13, but the effect of this elongation of the arm C—A will be partially neutralized by a slight elongation of the arm B—C.

For any desired ratio of actual load to indicated load, the location of the load-connecting opening 6 in the load-dividing bar 5 is determined by trigonometry applied to a parallelogram which illustrates the relationship of stresses or forces in the triangle A—B—C. This is shown in Figure 3 of the drawings.

The mathematical theory of the load range multiplier may be expressed by the following equations:

1. $$\frac{\text{Total stress } (T)}{\text{Stress in arm } C-A\,(T_2)} = \frac{\sin \phi_3}{\sin \phi_1}$$

or $$\phi_1 = \sin^{-1}\left(\frac{T_2}{T_1} \sin \phi_3\right)$$

2. $$d = \frac{\text{distance } A-B}{2} + \frac{\tan(30° - \phi_1) \times \text{distance } A-B}{1.154}$$

where $$\phi_1 + \phi_2 = 60°$$

Therefore $$\phi_3 = 180° - (\phi_1 + \phi_2) = 120°$$

With reference to Figure 3, the diagram illustrates to scale, distribution or division of the total stress (T) between the two arms B—C and C—A. In this connection it is highly important to keep in mind the fact that the physical construction of this invention is such that in use it assumes the shape and proportions of an equilateral triangle; therefore the sum of angles $\phi_1$ and $\phi_2$ is always 60 degrees. Further, the tensional stresses in the two arms B—C and C—A are truly represented by a parallelogram as shown. The total stress (T) is represented by the diagonal of said parallelogram, the stress in arm B—C by the longer dimension (side) of the parallelogram, and the stress in arm C—A (the arm in which is contained the indicating type tension measuring instrument) by the shorter dimension of the parallelogram.

The proportion of the total stress (T) to which the instrument arm C—A is subjected depends upon the point of intersection of the "axis of pull" with the axis passing through the holes 6 in the load dividing bar 5; that is, upon the point of connection to the load dividing bar. If this connection were made at point B, then arm B—C would be subjected to the total stress existent. On the other hand, if the connection were made at point A, then the instrument arm C—A would be subjected to the total stress existent. With the connection made at any point between these extremes, the instrument arm C—A will be subjected to only a definite fractional part of the total stress.

With the foregoing in mind, should it be desired to calculate at what distance $(d)$ from point A a connection is to be made to the load dividing bar 5, so that the indicating type measuring instrument 13 in arm C—A will measure a given fractional part of the total tension (T) whose value is to be determined, this may be done in the following manner.

It is to be noted that the determination of the value of $\phi_1$ which together with angle $\phi_2$ always equals 60 degrees, is merely incidental to the determination of the distance $(d)$.

The ratio of total stress (T) to the fractional part of the total stress to which the instrument arm C—A will be subjected $(T_2)$ is always equal to the ratio of "the sine of angle $\phi_3$" to "the sine of angle $\phi_1$"; that is, $$\frac{T}{T_2} = \frac{\sin \phi_3}{\sin \phi_1}$$

from which:

$$\phi = \sin^{-1}\left(\frac{T_2}{T} \sin \phi_3\right)$$

However, since $\phi_3$ always equals 120 degrees (in the parallelogram involved here) its sine function is a constant 0.866. Therefore the above equation can be expressed more specifically as follows:

$$\frac{T}{T_2} = \frac{0.866}{\sin \phi_1}$$

from which:

$$\phi_1 = \sin^{-1}\left(\frac{T_2}{T} 0.866\right)$$

The thus-described method of calculating the value of $(d)$ is based on bisecting the equilateral triangle from point C to a point exactly halfway between A and B, and performing a two-step calculation in order to confine the problem to solution of right triangles.

The term (½ distance AB) equals $(d)$ only when the angle $\phi_1$ happens to be 30 degrees. In all other cases, where the angle $\phi_1$ is either smaller or larger than 30 degrees, the value of $(d)$ will be greater or less than the value provided by the first term alone by the amount which the second term accounts for. The value 1.154 which appears as denominator in the second term of this equation is simply the ratio of the length of one side of the equilateral triangle to the length of the bisecting line from point C to a point on AB exactly half way between A and B.

It is understood that the form of my invention herewith shown and described is to be taken as a preferred example of same, and that various changes in the shape, size, and arrangement of parts may be resorted to without departing from the spirit of my invention or the scope of the subjoined claims.

Having thus described my invention, what I claim is:

1. A load range multiplier comprising a bar having longitudinally spaced openings adapted for having weights suspended therefrom or loads connected thereto, a tension element attached to one end of the bar, a second tension element attached to the opposite end of the bar, a scale connected in the second tension element, the arrangement being such that the tension elements converge to form a mechanical equilateral triangle, and means connected with the converged ends of the tension elements for connecting the device with a member which exerts a pulling force.

2. A load range multiplier comprising a bar having spaced openings to which loads may be connected, said openings being arranged near one end of said bar, a tension element attached to the bar at its end near the openings, a tension element attached to the bar at its ends remote from the openings, a load-measuring instrument connected in the last-named tension element, the arrangement being such that the tension elements converge to form an equilateral triangle with the bar, and means connecting the converged ends of the tension elements for connecting the device with a member which exerts a pulling force.

3. A load range multiplier comprising a rigid bar having spaced openings to which loads may be connected, said openings being arranged near one end of the bar, a chain attached to the bar at its end near the openings, a chain attached to the bar at its end remote from the openings, a scale connected in the last-named chain, the arrangement being such that the chains converge to form with the bar an equilateral triangle and a pull ring connecting the converged ends of the chains.

EDWIN S. STAPLES.

REFERENCES CITED

The following references are of record in the file of this patent:

UNITED STATES PATENTS

| Number | Name | Date |
| --- | --- | --- |
| 1,766,355 | Redman | June 24, 1930 |
| 2,235,279 | Bunker | Mar. 18, 1941 |
| 2,376,037 | Davies | May 15, 1945 |

FOREIGN PATENTS

| Number | Country | Date |
| --- | --- | --- |
| 152,208 | Germany | June 13, 1904 |